(12) United States Patent
Berke et al.

(10) Patent No.: US 9,274,581 B2
(45) Date of Patent: Mar. 1, 2016

(54) DATE ADJUSTED POWER BUDGETING FOR AN INFORMATION HANDLING SYSTEM

(71) Applicant: Dell Products, LP, Round Rock, TX (US)

(72) Inventors: Stuart Allen Berke, Austin, TX (US); John E. Jenne, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 311 days.

(21) Appl. No.: 13/924,988

(22) Filed: Jun. 24, 2013

(65) Prior Publication Data

US 2014/0380069 A1    Dec. 25, 2014

(51) Int. Cl.
    *G06F 1/32*     (2006.01)

(52) U.S. Cl.
    CPC ........................ *G06F 1/32* (2013.01)

(58) Field of Classification Search
    CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
    USPC .......................... 713/300, 310, 320, 322, 323
    See application file for complete search history.

(56) References Cited

U.S. PATENT DOCUMENTS

| | | | |
|---|---|---|---|
| 7,281,146 | B2 | 10/2007 | Nalawadi et al. |
| 7,464,278 | B2 * | 12/2008 | Cohen et al. ................. 713/320 |
| 7,793,126 | B2 | 9/2010 | McGrane et al. |
| 2006/0150251 | A1 | 7/2006 | Takashima et al. |
| 2007/0300083 | A1 * | 12/2007 | Goodrum et al. ............. 713/300 |
| 2008/0184044 | A1 | 7/2008 | Leech et al. |
| 2009/0177334 | A1 | 7/2009 | Artman et al. |
| 2011/0066865 | A1 | 3/2011 | Bandholz et al. |
| 2011/0239013 | A1 | 9/2011 | Muller |
| 2011/0296098 | A1 | 12/2011 | Sauber et al. |
| 2012/0066519 | A1 | 3/2012 | El-Essawy et al. |
| 2012/0185706 | A1 | 7/2012 | Sistla et al. |
| 2012/0271671 | A1 | 10/2012 | Zaloom |
| 2013/0132759 | A1 * | 5/2013 | Lathrop et al. ................ 713/340 |
| 2014/0188434 | A1 * | 7/2014 | Steinbrecher et al. ........ 702/184 |

OTHER PUBLICATIONS

International Search Report; International Application No. PCT/US2014/041061.

* cited by examiner

*Primary Examiner* — Zahid Choudhury

(74) *Attorney, Agent, or Firm* — Larson Newman, LLP

(57) ABSTRACT

An information handling system determines a system configuration including a hardware module, and determines an adjusted power budget for the hardware module. The adjusted power budget is based on a calculation including a difference between a date code read from the hardware module and a baseline date, a baseline power budget, a power reduction period and a power reduction interval. The calculation may optionally include a risk factor. In alternate embodiments, an adjusted power budget for a hardware module may be calculated by an order processing system for information handling systems, or by a planning tool for a data center which contains information handling systems.

20 Claims, 12 Drawing Sheets

DATE ADJUSTED POWER BUDGETING FOR AN INFORMATION HANDLING SYSTEM

FIELD OF THE DISCLOSURE

The present disclosure generally relates to information handling systems, and more particularly relates to determining power budgets for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, networking systems, and data storage systems.

An information handling system in a particular installation may have a power budget. Within the information handling system a particular component or a particular module may have a power budget. An estimate of a power budget for an information handling system or for components of the information handling system may be used in order processing systems, data center planning systems, and in making decisions concerning the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
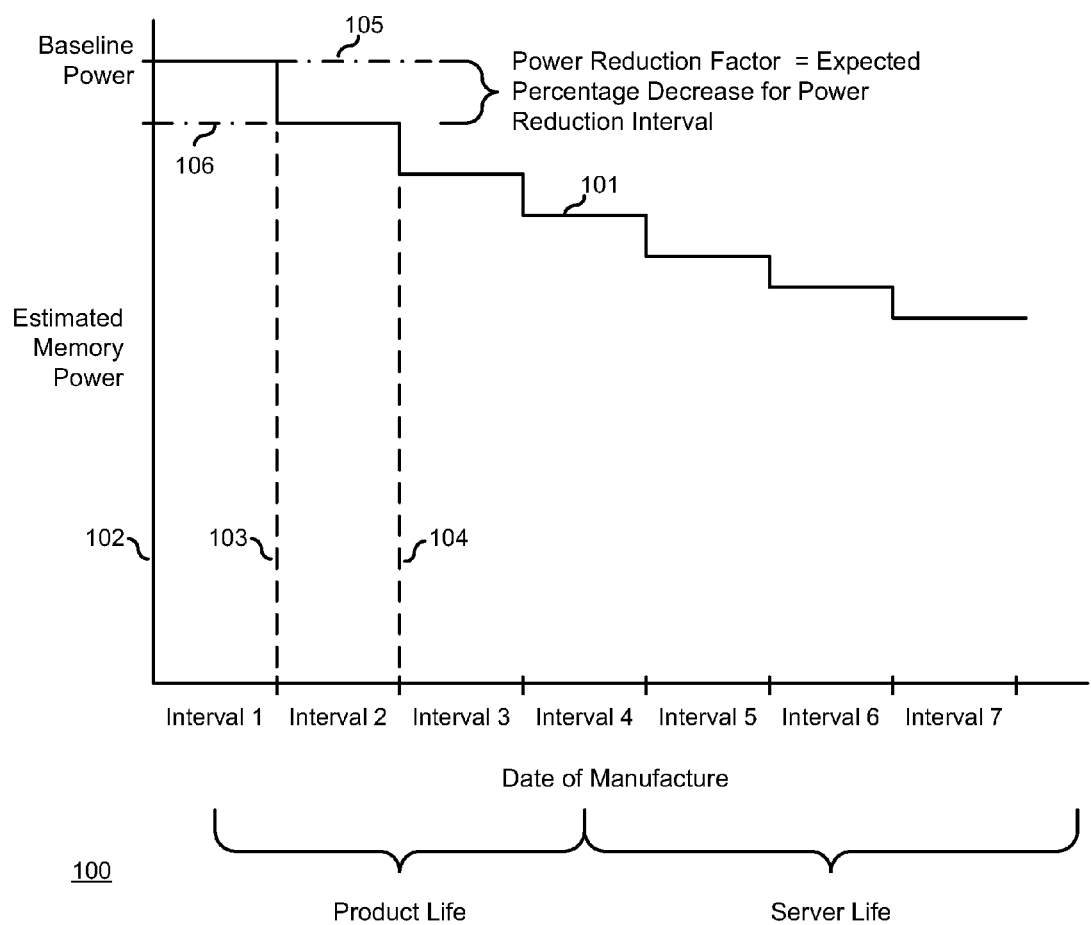
FIG. 1 is a graph of estimated power versus the date of manufacture for memory devices used in information handling systems according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Estimates of the power that an information handling system will consume are used in controlling and optimizing the operation of information handling systems, in determining allowable and orderable configurations for information handling systems, and in designing and planning data center infrastructure to support information handling systems. Overestimation of power consumption leads to non-optimal solutions, over-provisioning of power and cooling resources, and lower overall capability, density, and performance. Underestimation of power consumption leads to under-provisioning of power and cooling resources, and a high risk of throttling operational performance. Hence, it is critical that the tools, methods, and algorithms used to estimate power for operation, ordering, and planning an information handling system are consistent and provide a reasonable level of accuracy in order to meet customer expectations. In an embodiment, manufacturing date of information handling system component data, combined with current date, are used to ensure that operating, ordering, and planning power estimates stay synchronized.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In an embodiment, information used to make power consumption estimates for components of an information handling system is stored in a power budget table. Various systems, for example order processing systems and data center planning systems, access the power budget table to obtain power information for a component of the information handling system. In an embodiment, an information handling system uses an adjusted power budget based on information stored in a power budget table to make a decision concerning the operation of the information handling system. For example, an information handling system may make a decision that sufficient power headroom is available to create a new virtual machine environment, or that additional components may be installed, or that existing components may operate at a higher level of performance.

The information in a power budget table may be determined during the design and development phases of an information handling system through measurement of sample components in order to determine average or typical values, or provided by supplier component data sheets. However, the design or manufacture of a particular type of component used in the information handling system may be improved after the information handling system design is complete. A particular information handling system manufactured based on the information handling system design may use a component of the particular type that consumes less power than indicated in the power budget table. For example, a memory module manufactured several years after an information handling system design is complete may consume less power than the sample memory modules measured to provide information for the power budget table. Thus the power budget table will indicate power consumption that is too high for the newer modules. Some types of components, for example dual in-line memory modules (DIMMs), have design or manufacturing improvements made on an approximately regular basis. Manufacturers of such components may perform process and geometry shrinks on the component designs, or adopt new power savings techniques. These enhancements maintain the functionality of a component type while reducing power consumption. A particular information handling system constructed using the information handling system design will consume less power using a shrunken version of a component compared to a system constructed using a version of a component manufactured without a shrink. For types of components for which improvements are expected a model of the expected improvements allows an adjustment to be made to power consumption estimates based on information in a power budget table without a need to measure the newer components or to update the power budget table.

FIG. 1 shows power graph 100 illustrating the decrease in estimated power for a memory device over the manufacturing and installation life of an information handling system product according to an embodiment of the present disclosure. Power curve 101 at FIG. 1 shows a representative model of a relationship between power consumed by memory devices of a particular type manufactured during intervals of the life of an information handling system design. The vertical axis of the graph represents the estimated power consumed by a memory device. The horizontal axis represents time as power reduction intervals. The model predicts that at the beginning of each power reduction interval after the first interval the manufacturers of the memory devices perform a shrink on the memory device design which reduces the power consumed by memory devices manufactured in the interval compared with memory devices manufactured during the preceding interval. In an embodiment, the intervals at which shrinks occur are modeled as constant duration power reduction intervals. The duration of the power reduction intervals may be determined as a historical average of the time between shrinks in the same or similar memory technologies. In an embodiment, the length of a power reduction interval may be based on input from a user. At FIG. 1 the first power reduction interval is the interval between times 102 and 103, and the second power reduction interval is the interval between times 103 and 104. Actual power reduction intervals, or intervals between shrinks for memory technologies, have been observed in a range from nine months to 15 months, although the present disclosure is not limited to any particular interval. Any power reduction interval may be used that characterizes approximately regularly occurring improvements in a memory technology or in a technology of other components used in information handling systems. In an alternate embodiment, the power reduction intervals may be modeled to occur with non-regular periods of any length and number.

The power consumed by a memory device manufactured during a power reduction interval after the first interval is predicted to be less than the power consumed by a memory device manufactured during the preceding interval due to a shrink of the memory design performed by the manufacturer, or due to the adoption of other power savings techniques. In an embodiment, the reduction in power consumed from one shrink to the next is modeled as a decrease from one shrink to the next of a constant percentage, referred to herein as a power reduction factor. In additional embodiments, the reduction in power consumed from one shrink to the next is modeled as a decrease from one shrink to the next of a variable percentage. In an embodiment, a power reduction factor for a memory technology is based on historical data of the same or of similar memory technologies. In additional embodiments, a power reduction factor is based on user input to an order processing system or to a data center planning system. A power reduction factor is illustrated at FIG. 1 as the difference between baseline power level 105 and estimated power level 106 at the second power reduction interval. The power consumed by a memory device manufactured during the interval from time 103 to time 104 (the second power reduction interval) is illustrated as approximately 85% of the power consumed by a device manufactured during the interval from time 102 to time 103 (the first power reduction interval). Similarly, the power level for each power reduction interval of power curve 101 is illustrated as approximately 85% of the power level of the preceding power reduction interval.

Baseline power 105 for a type of memory is determined through intensive characterization of sample memory devices or of sample memory modules. Characterization measures the power consumed by devices under various operating conditions. The result of characterization is a baseline power value characteristic of the type of devices or of the type of modules. In an embodiment, devices manufactured by multiple memory device manufacturers are characterized to provide one baseline power value for a device type or for a module type. In other embodiments, baseline power values may be determined on a per manufacturer basis or on another basis. A baseline date is selected to represent this baseline power measurement. The baseline date is the beginning of the first power reduction interval. At FIG. 1, time 102 is the baseline date. In an embodiment, the baseline date is based on the date or dates of measurement of the memory devices or memory modules. In other embodiments, the selected baseline date is a date based on the first manufacture of the memory devices or memory modules or is a date of manufacture of the characterized memory devices or memory modules. In yet another embodiment, the baseline date is selected by a user of a planning or ordering software application.

An estimate of the power consumed by a device manufactured in a particular power reduction interval is computed by counting the number of complete power reduction intervals that have elapsed between the baseline date and the date of manufacture of the device. The number of complete intervals is applied as an exponent to a power reduction factor characteristic of the memory technology. The resulting value is multiplied by the baseline power. The calculation is described by the equation:

$$\text{Estimated Power} = BL * H^P$$

In the equation above BL is the baseline power for a device type. This value is represented at FIG. 1 as power level 105. The value H is the power reduction factor, illustrated as the constant percentage ratio between adjacent steps in power graph 101. At FIG. 1, the power factor is illustrated as approximately 0.85 (85%). The value P is the number of power reduction intervals between the baseline date and the date of manufacture of the device. The number of power reduction periods that have elapsed is calculated by subtracting the baseline date from the date of manufacture and dividing the difference by the length of a power reduction interval. In an embodiment, dates of manufacture of memory modules or memory devices are given by year and week. For example, a memory device manufactured in the year 2013, week 27, is of a type having a baseline date of year 2010, week 42. The difference between the date of manufacture of the device and the baseline date of the type is 2 years, 37 weeks. The difference is divided by the length of a power reduction interval. In the present example, the power reduction interval for the type of device is one year (1 year, 0 weeks). For ease of calculation, the difference of 2 years, 37 weeks, may be expressed as 141 weeks and the power reduction interval of 1 year, 0 weeks, may be expressed as 52 weeks. Dividing 141 by 52 gives a quotient of approximately 2.7. As shrinks occur at discrete times, taking the whole number portion of the quotient, 2 in this example, gives the number of power reduction intervals P that are estimated to have occurred between the baseline date and the manufacturing date.

Continuing the example with P=2, with a baseline power of 5 W and a power reduction factor for the device type of 0.85, the estimated power for memories manufactured during the third power reduction interval is:

$$\text{Estimated Third Power Reduction Interval} = 5\,W * 0.85^{(2)}$$

Evaluating this expression gives an estimated power of approximately 3.6 W.

It will be apparent to those skilled in the art that for a date of manufacture during the first power interval that the calculation of P as described above results in a value of 0 (zero). A value of zero for P results in the estimated power being equal to the baseline power. In an embodiment, the power reduction curve may be modeled as a continuous function of time, instead of a discrete function of time having steps, and values of P that are not whole numbers may be used. In such an embodiment the calculated value of estimated power for a time during the first power reduction interval may not be the baseline power.

In an embodiment, the calculation of estimated power includes a risk factor to adjust the power reduction factor. Using a risk factor, the formula for estimating power is:

$$\text{Estimated Power} = BL * (H * R)^P$$

The values BL, H and P are as described above. A value of R is selected to adjust the power reduction factor. Values of R greater than 1, for example 1.1, may be used to calculate a higher, more conservative estimated power. Using values of R less than 1, for example 0.9, may be used to calculate a lower, more aggressive estimated power. In an embodiment, the value of R is selected in response to more information about power reduction of devices becoming available. For example, when power reductions for a several consecutive power reduction periods are less than anticipated using a value of R greater than 1 may produce more accurate estimates of power consumption. In an embodiment, the value of R may be selected by the user of a planning tool, for example a data center planning system, to adjust power.

The foregoing discussion describes the use of a manufacturing date of a device in the calculation of estimated power. In planning tools, such as order processing systems or data center planning systems, the devices for which power is estimated may not be available. In such instances another date may be used to approximate the date of manufacture of a device. In an embodiment, the current date is used. In other embodiments, a requested delivery date for an information processing system or a requested build date for a data center may be used.

Figure 2:
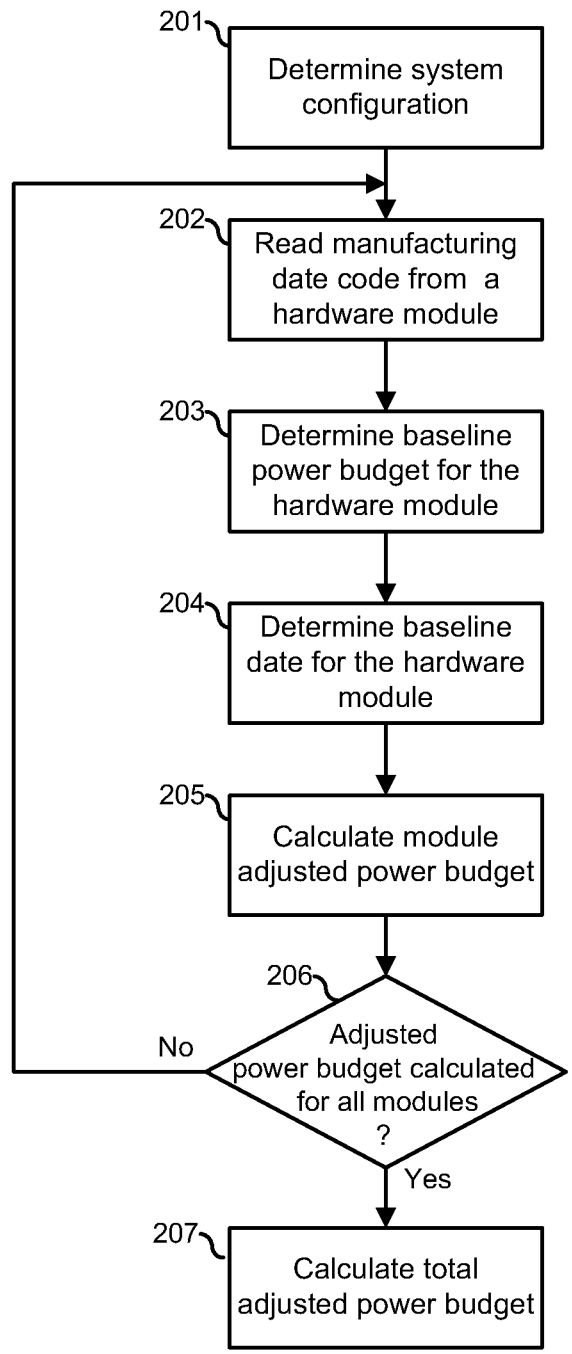
FIG. 2 is a flow diagram illustrating a method for calculating an adjusted power budget for hardware modules in an information handling system according to an embodiment of the present disclosure.

FIG. 2 shows flow diagram 200 of a method for determining an adjusted power budget for a hardware module in an information handling system. An estimated power reduction budget may be used by an information handling system to make operational decisions, for example to start a virtual machine or to control a power supply. The method begins at step 201. At step 201 a system configuration for the information handling system is determined. The system configuration includes information about the numbers and types of hardware modules in the information handling system for which an adjusted power budget is to be calculated. In an embodiment, the system configuration is stored in nonvolatile memory in the information handling system. In another embodiment, the system configuration is determined by reading configuration information directly from hardware modules. In other embodiments, the system configuration is stored on a hard disk drive or is available from a server through a network port on the information handling system.

The method continues at step 202 reading a manufacturing date code from a hardware module. In an embodiment, a memory module has a date code stored in nonvolatile memory on the memory module as described with respect to FIG. 3.

At step 203 the method determines a baseline power budget for the hardware module. The particular type of hardware module is determined at step 201 as part of the system configuration. Each type of hardware module has a baseline power budget determined as described with respect to FIG. 1. In an embodiment, an information handling system stores baseline power budget information in a power budget table. A power budget table entry includes an indication of the type of hardware module described by the entry and a baseline power budget for the hardware module type. At step 203 a power budget table is searched for an entry describing the hardware module type determined at step 201. A baseline power budget corresponding to the hardware type is read from the power budget table. In an embodiment a power budget table is stored in nonvolatile memory. In another embodiment, the information handling system accesses a server system to obtain power budget table information. In an embodiment, the baseline power budget value for a hardware module is stored within the hardware module, and a processor in the information handling system determines the baseline power budget by reading the value from the hardware module.

At step 204, a baseline date for the hardware module is determined. Each hardware module type has a baseline date associated with the baseline power budget. As discussed with respect to FIG. 1, the baseline date is a date selected to represent the beginning of the first power reduction interval for a type of hardware module. In an embodiment, the baseline date is stored in the power budget table entry with the baseline power budget. In another embodiment, the baseline date is stored within the hardware module and a processor in the information handling system determines the baseline date by reading it from the hardware module.

At step 205, the method calculates a module adjusted power budget. The calculation is performed as described with respect to FIG. 1. The baseline power at FIG. 1 is the baseline power budget determined at step 203. The number of power reduction periods P at FIG. 1 is calculated by subtracting a manufacturing date based on the date code determined at step 202 from the baseline date determined at step 204, and dividing the difference by a power reduction period. In an embodiment, the value of the power reduction period is read from a power budget table. In an embodiment, the value of a power reduction factor is read from a power budget table. In an embodiment, the calculation includes a risk factor.

At step 206, the method determines whether an adjusted power budget has been calculated for all modules in the system configuration. If there are modules for which an adjusted power budget has not been calculated, the method returns to step 202 to calculate an adjusted power budget for another module. If an adjusted power budget has been calculated for all hardware modules, the method continues at step 207. At step 207, the adjusted power budgets for hardware modules in the system configuration are summed to calculate a total adjusted power budget.

Figure 3:
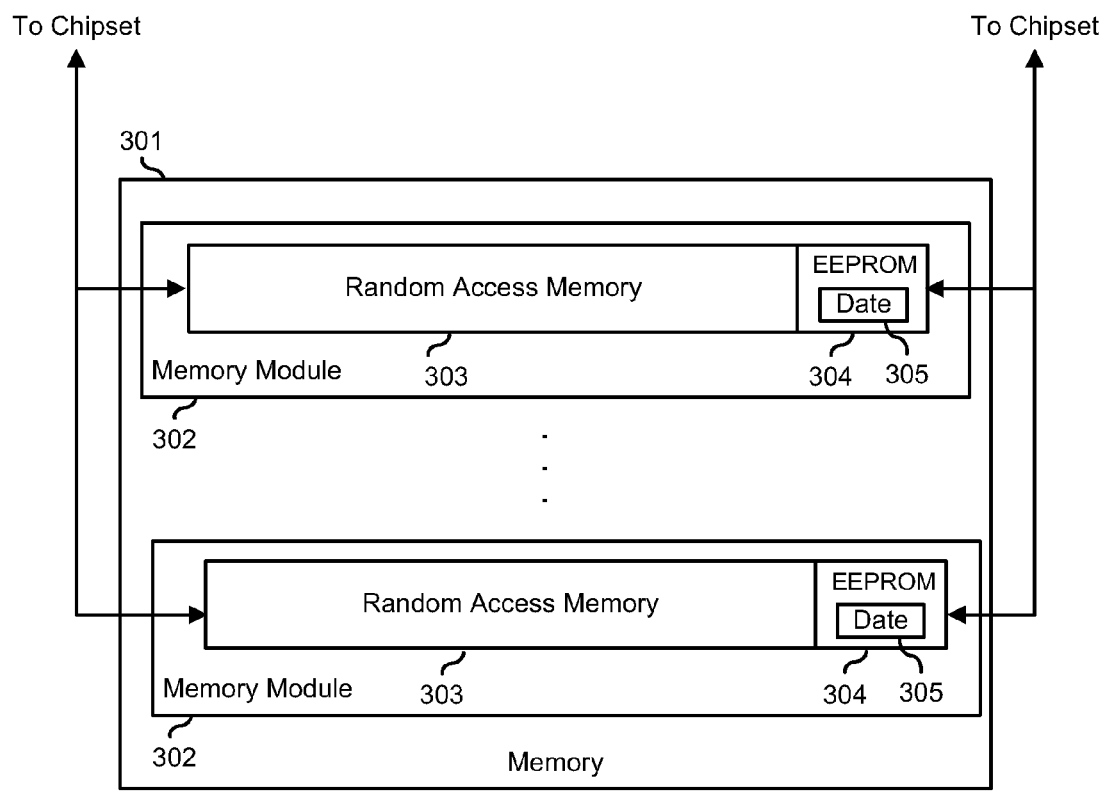
FIG. 3 is a block diagram of a memory module according to an embodiment of the present disclosure.

FIG. 3 shows a block diagram 300 of a memory 301 of an information handling system according to an embodiment of the present disclosure. As discussed with respect to flow diagram 200, in particular embodiments an information handling system reads information about a hardware module from the hardware module itself. Block diagram 300 illustrates an example memory sub-system that stores information related to the memory sub-system, for example a date of manufacture, and provides the information to a processor in the information handling system. In an embodiment, memory 301 provides storage for application programs as discussed with respect to FIG. 12. Memory 301 includes one or more memory modules 302. Each memory module 302 includes a random access memory 303 and an electrically erasable programmable read-only memory (EEPROM) 304. In an embodiment, memory modules 302 are dual in-line memory modules (DIMMs) and random access memory 303 include synchronous dynamic random access memory (SDRAM) circuits. A processor accesses data in random access memory 303 through a chipset as described with respect to FIG. 12. Portions of the information handling system may access data in EEPROMs 304 through a second connection between memory module 302 and the chipset. In an embodiment, the second connection is a system management bus connection. SMBus is a system management bus well known in the art suitable for reading data from EEPROMs 304. A memory module 302 is assigned a range of addresses on the system management bus. Each location in EEPROM 304 is assigned an address on the system management bus.

EEPROM 304 is programmed by the manufacturer of a memory module 302 with information specific to the memory module 302 and random access memory 303. Standards well known in the art for the format and content of data within EEPROMs 304 may be employed in conjunction with the present disclosure, for example the DDR3 Serial Presence Detect (SPD) standard of the JEDEC Solid State Technology Association. Examples of information that may be stored in EEPROMs 304 include a module serial number, type information for random access memories 303, width of the data path to the module, clock cycle time, and date of manufacture. At FIG. 3, a date 305 stored in EEPROM 304 represents the date of manufacture of memory module 302 containing EEPROM 304. In an embodiment, the year of manufacture is stored as a two digit binary code decimal value at byte address 120 and the week of manufacture is stored as a second two digit binary code decimal number at address 121. At step 202 of FIG. 2, the method reads a manufacturing date code. In an embodiment, a processor of an information handling system is operable to read data from devices connected to a system management bus. A program executing on the processor reads data from EEPROM 304 of memory module 302 by accessing a predetermined location with the range of addresses on the system management bus for memory module 302.

Figure 4:
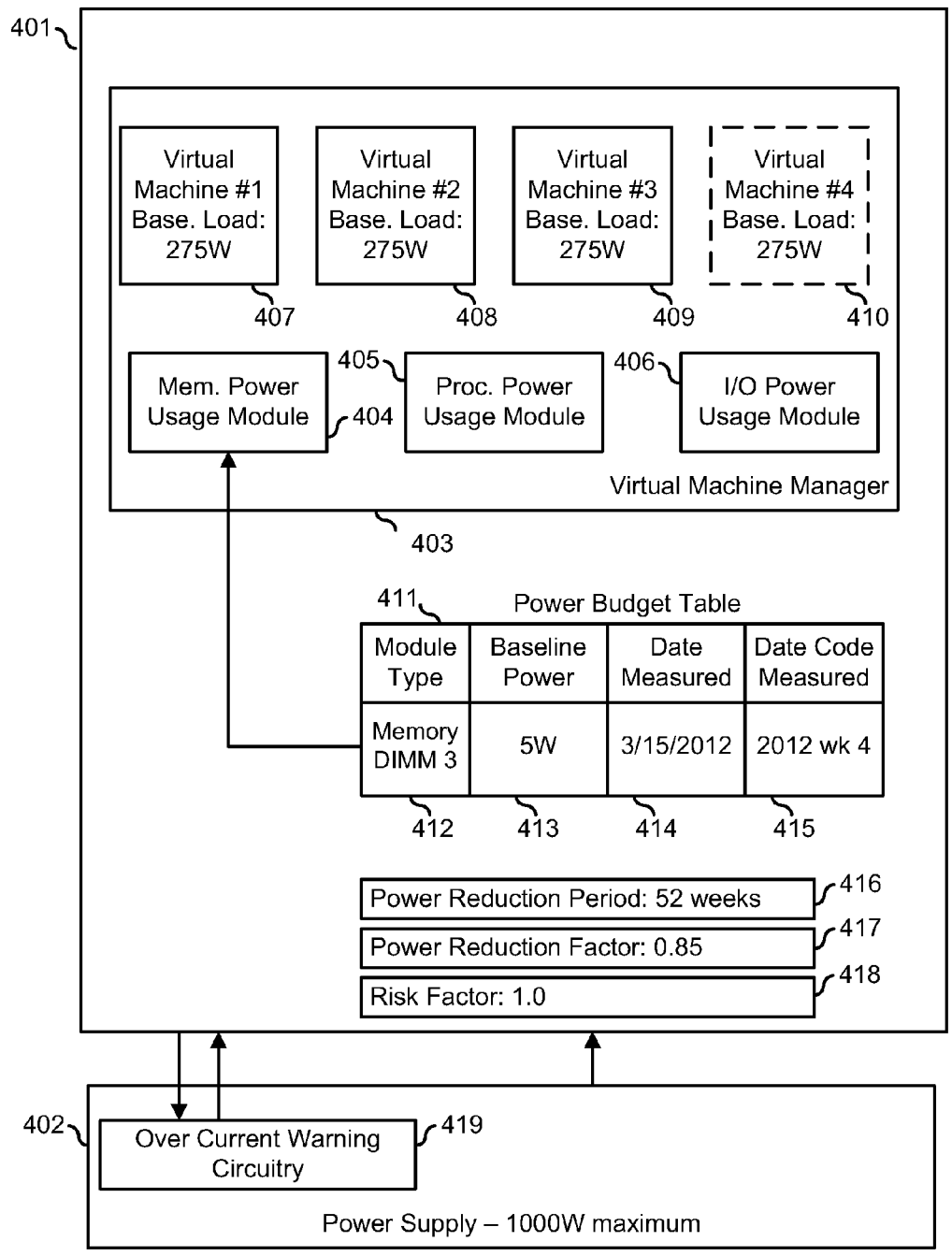
FIG. 4 is a block diagram of an information handling system using virtual machines according to an embodiment of the present disclosure.

FIG. 4 shows block diagram 400 of a node in an information handling system according to an embodiment of the present disclosure. Node 401 executes software for a virtual machine manager 403. Virtual machine manager 403 manages virtual machines executing on node 401. Based on a total adjusted power budget, as described with respect to FIG. 2, virtual machine manager 403 creates a new virtual machine. At FIG. 4, virtual machine manager 403 manages virtual machines 407, 408 and 409. Virtual machine manager 403 also manages the creation of virtual machines in response to requests received from other programs (not shown). At FIG. 4, a request is received at the virtual machine manager 403 to create virtual machine 410. Virtual machine manager 403 determines to grant the request to create virtual machine 410 on node 401 based on the availability of sufficient resources. In the example illustrated at FIG. 4, virtual machines 407-410 managed by virtual machine manager 403 are characterized by sets of resource requirements including memory power usage, processor power usage and I/O power usage. Virtual machine manager 403 evaluates the request to create virtual machine 410 to determine whether enough power is available by estimating the total power required by virtual machines 407-410. If the estimate of total power required by virtual machines 407, 408 and 409 and the requested virtual machine 410 is less than the power available at node 401, virtual machine manager 403 creates virtual machine 410.

Node 401 receives power from power supply 402. For purposes of illustration, power supply 402 as shown at FIG. 4 supplies up to 1000 W that may be allocated by virtual machine manager 403 to virtual machines. Virtual machine manager 403 estimates a power budget for each virtual machine based on the resources required by the virtual machine, for example by the amount of memory required. Memory power usage module 404, processor power usage module 405 and I/O power usage module 406 calculate estimated memory power, processor power and input/output power, respectively. Virtual machine manager 403 combines the estimated power values from each of the modules to produce a power estimate for each virtual machine. At FIG. 4, the estimated baseline power consumption for virtual machines 407-410 is 275 W each. The baseline power estimated for virtual machines 407-409 together is 825 W. The estimate of 825 W is less than the 1000 W maximum of power supply 402. Adding virtual machine 410 requires an additional estimated 275 W for a total estimated baseline power consumed by the virtual machines 407-410 of 1100 W. The estimated total baseline power of 1100 W is greater than the 1000 W maximum of power supply 402, thus virtual machine manager 403 is unable to start virtual machine 410 based on the baseline power estimate. Employing an adjusted power budget computed as described with respect to FIG. 2 allows virtual machine manager 403 to compute an improved estimate of power consumption for virtual machines 407-410.

A memory power usage module 404 of virtual machine manger 403 accesses power budget table 411. Power budget table 411 contains an entry corresponding to the memory module of the information handling system. The entry includes module type 412, baseline power 413, date measured 414 and date code measured 415. Memory power module 404 reads baseline power 413 and date code measured 415. In an embodiment, memory power module also reads date measured 414. Memory power module 404 reads power reduction period 416 and power reduction factor 417. In an embodiment, memory power module also reads risk factor 418. Memory power module 404 performs the method described at FIG. 2 to calculate an adjusted power budget for memory used by virtual machines 407-409 and for memory requested for virtual machine 410. Virtual machine manager 403 bases an estimate for total power consumption of virtual machines 407-410 on the adjusted memory power budgets. As power consumption estimates for memory manufactured in power reduction intervals after the first power reduction interval are less than the baseline power, the total estimated power consumption for virtual machines 407-410 will be less for the second and subsequent power reduction intervals than for the first power reduction interval.

Figure 5:
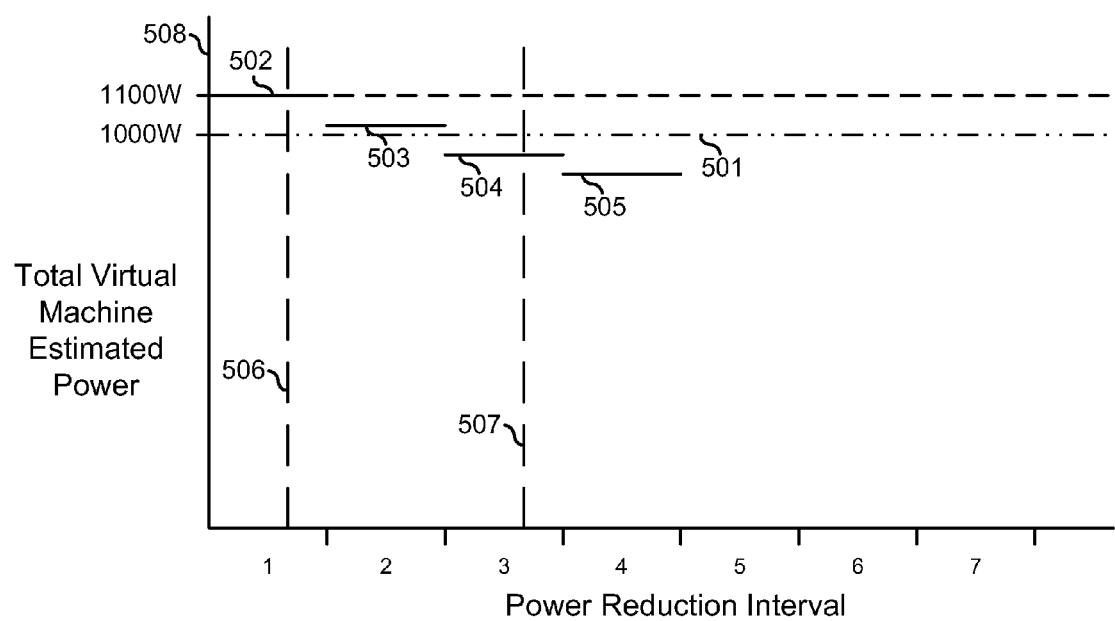
FIG. 5 is a graph illustrating estimated power consumption of virtual machines according to an embodiment of the present disclosure.

FIG. 5 shows power graph 500 of total virtual machine estimated power vs. power reduction intervals in accordance with an embodiment of the present disclosure. The vertical axis of the diagram represents the total estimated power for virtual machines 407-410 as discussed with respect to FIG. 4. The horizontal axis represents the power reduction interval in which the memory modules in the information handling system of node 401 are manufactured. Power level 501 is the maximum power rating of power supply 402. Estimated power levels 502-505 are the total virtual machine power consumption estimates using memory modules manufactured in power reduction intervals 1-4, respectively, made by virtual machine manager 403 for virtual machines 407-410, in accordance with an embodiment of the present disclosure. Estimated power level 502 at time 506, corresponding to power reduction interval 1, is the estimated baseline power for the virtual machines without any adjustment for date of manufacture of a memory module. Absent the present disclosure, virtual machine manager 403 makes the same power estimate for virtual machines 407-410 regardless of the power reduction interval in which memory modules are manufactured. The estimated power 502 is 1100 W. 1100 W is greater than the 1000 W that power supply 402 is able to provide, thus virtual machine manager 403 does not start virtual machine 410 based on this estimate. At time 507, a time in power reduction interval 3, the power estimated by virtual machine manager 403 based on an adjusted power budget computed as described herein is shown as power level 504. Power level 504 is less than 1000 W. Virtual machine manager 403 starts virtual machine 410 based on the estimated power level 504.

An information handling system may control one or more power supplies or one or more voltage regulators based on a total adjusted power budget as calculated at FIG. 2. In an embodiment, an information handling system includes power supplies and voltage regulators with adjustable over-current warning capability. The power supplies provide power to the hardware modules of the system configuration determined at step 201. At FIG. 4, power supply 402 includes over current warning circuitry 419 having a programmable over-current warning threshold. Over current warning circuitry 419 provides an over-current warning to information handling system node 401 in response to the output current of the power supply 402 exceeding the over-current warning threshold. The over-current warning mechanism provides a fail-safe in case a power budget reduction estimate is too aggressive. In an embodiment, a memory voltage regulator has a programmable over-current warning threshold that triggers memory throttling. In another embodiment, a power supply programmable over-current warning threshold may trigger node level, subsystem level, or processor level throttling. By setting the programmable over-current warning thresholds advantageously, even when the power reduction estimates are over-aggressive versus the actual power consumed, the system will safely self regulate within the available power supply and voltage regulator limitations.

Figure 6:
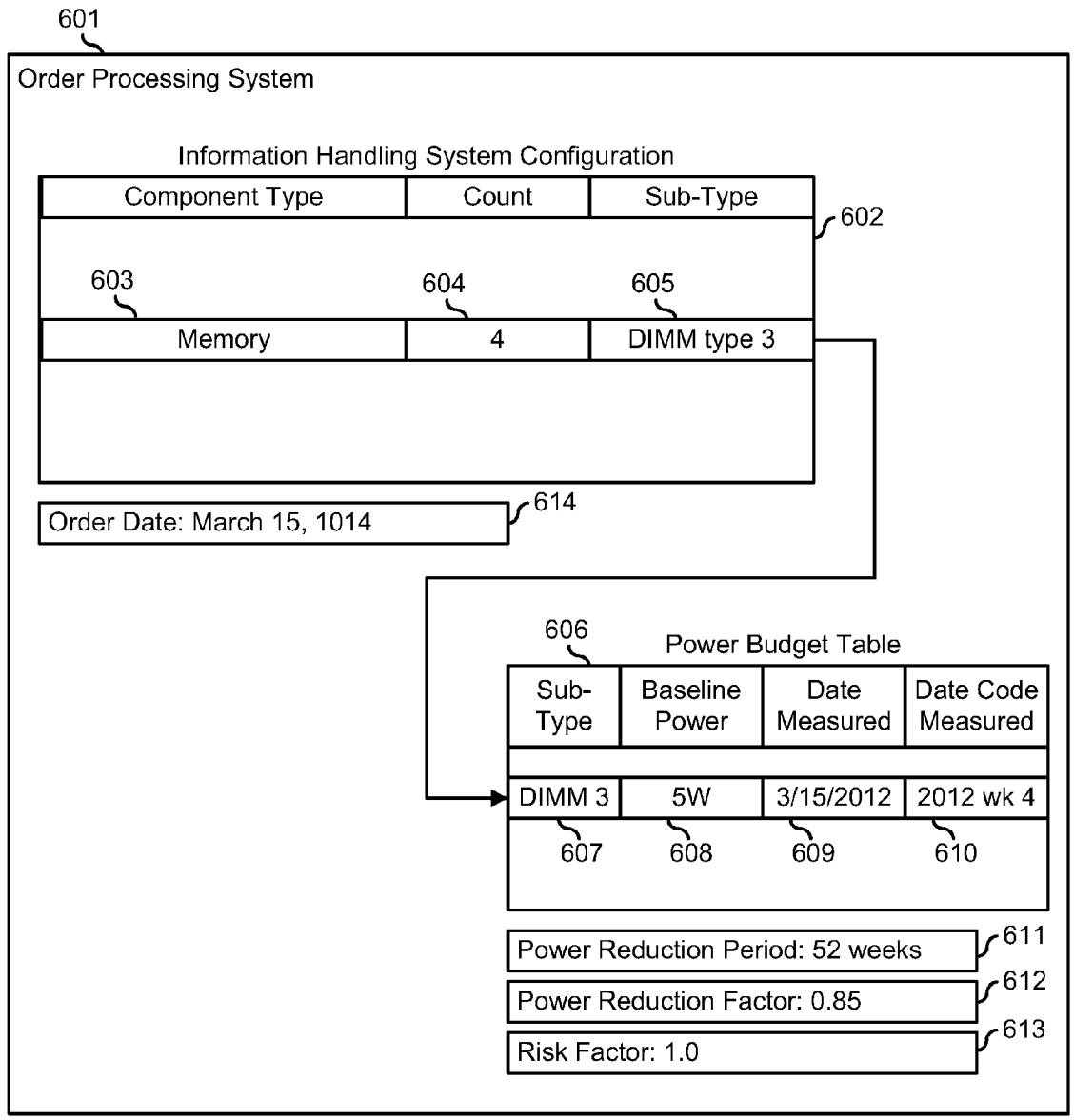
FIG. 6 is a block diagram of an order processing system according to an embodiment of the present disclosure.

FIG. 6 shows block diagram 600 of an order processing system 601 according to an embodiment of the present disclosure. The order processing system 601 estimates power for an information handling system based on an adjusted power budget for a hardware module calculated as discussed with respect to FIG. 1. The order processing system 601 is implemented using computer hardware including a memory and a processor. The processor executes instructions stored in the memory to implement order processing system functions. The data order processing system 601 calculates an estimated power consumption of a information handling system constructed using information handling system configuration 602. The information handling system configuration 602 includes information identifying hardware modules. For example, information may be stored in a configuration specifying the number and types of memory modules and of disk drive modules. Information handling system configuration 602 illustrates a portion of a configuration for an information handling system including a type of memory module. The specification of a memory module type has an entry including a component type 603, a count 604 and a sub-type 605. Order processing system 601 includes order date 614 associated with information handling system configuration 602. In an embodiment, the order processing system 601 uses the current date as order date 614. In an embodiment, the order processing system 601 uses a construction date for the information handling system described by configuration 602 as order date 614. In an embodiment, the order date 614 is a date based on input provided by a user of the order processing system 601. For example, the order date 614 may be calculated as a fixed number of weeks prior to a desired date entered by a user for delivery of an information handling.

The order handling system 601 includes a power budget table 606. Each entry in the power budget table 606 contains information about a particular type of hardware module. For purposes of illustration an entry in power budget table 606 includes a module sub-type 607, a baseline power budget 608, a measurement date 609, and a date code 610 of the device measured to obtain the baseline power budget 608. The baseline power budget 608 and dates 609 and 610 in the power budget table 606 are determined as discussed with respect to FIG. 1. The order processing system 601 includes values for a power reduction period 611, for a power reduction factor 612 and for a risk factor 613. In an embodiment, each entry in power budget table 606 includes a power reduction factor, power reduction period and risk factor. It will be obvious to those skilled in the art that numerous variations of storing power reduction periods, power reduction factors and risk factors are possible, for example including a power reduction period and a power reduction factor in each power budget table entry while using a single risk factor for the order processing system.

In embodiments of the present disclosure the hardware modules are memory modules. A memory module may be a dual in-line memory module or other memory module based on synchronous dynamic random access memories. In an embodiment memory module is flash memory, including SD Card or Compact Flash devices. In an embodiment, a memory module includes on-board memory devices, for example memory for a baseboard management controller soldered to a circuit board. In additional embodiments, hardware modules are mass storage modules. A mass storage module may be a hard disk drive or a solid-state drive, designed to be attached to an information handling system by a Serial Attached SCSI (SAS) interface, a Serial ATA (SATA) interface, or a PCI Express interface.

Figure 7:
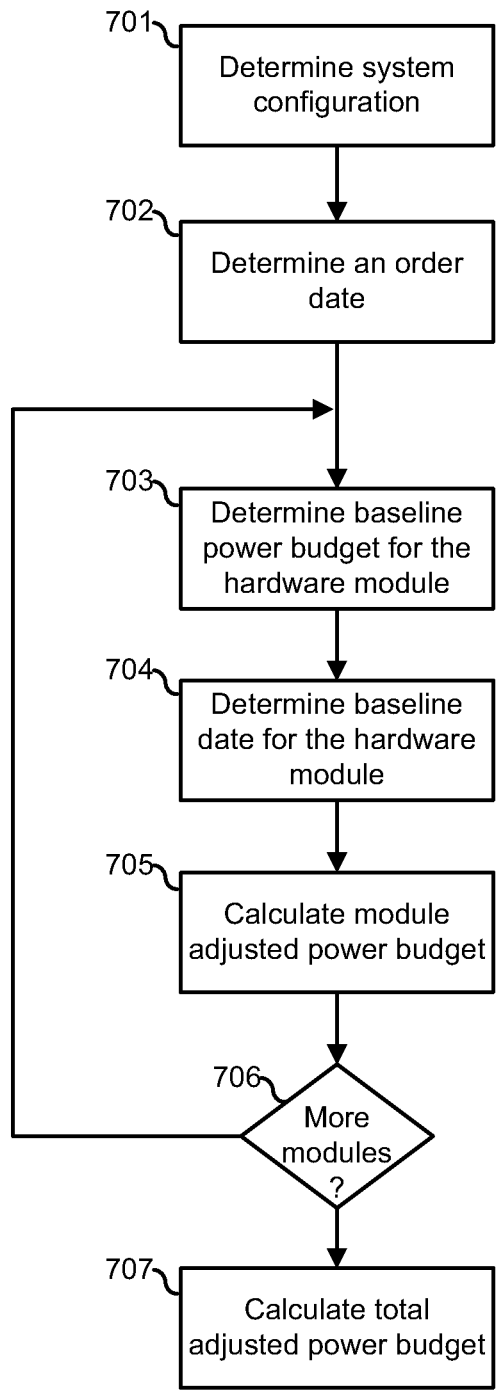
FIG. 7 is a flow diagram of a method for calculating a total adjusted power budget in an order processing system according to an embodiment of the present disclosure.

FIG. 7 show flow diagram 700 of a method for calculating a total adjusted power budget for an information handling system configuration in an order processing system. The processor of the order processing system executes instructions to perform the method. At step 701 the processor determines an information handling system configuration. In an embodiment, the configuration is determined based on a user selecting hardware modules using the order processing system. In another embodiment, the configuration is determined using a predetermined template which the user may adjust, for example by selecting a number of memory modules to be included in the configuration. At step 702 the processor determines an order date to be used in the calculation of an adjusted power budget for a hardware module. In an embodiment, the order date is determined within the order processing system. An order date may be the current date, or may be an estimated date that an information handling system will be constructed based on the configuration. In an embodiment, the order date is based on input provided by a user. For example, the order date may be calculated as a fixed number of weeks prior to a desired delivery date entered by a user. At step 703 the processor determines the baseline power budget for the hardware module. The processor reads type and sub-type information for the hardware module from the system configuration. A power budget table includes an entry corresponding to the type and sub-type of hardware module. The processor reads a baseline power budget value from the power budget table entry corresponding to the type of hardware module. At step 704 the processor determines a baseline date. In an embodiment, the processor reads the baseline date value from a field of the power budget table entry corresponding to the type and sub-type of the hardware module. In embodiments, the baseline date is a date code of a device measured to provide the baseline power budget value, or is a date on which the baseline power budget was determined.

At step 705, the processor calculates an adjusted power budget based on a time interval between the baseline date and the order date; the baseline power reduction; a power reduction period; and a power reduction factor as described with respect to FIG. 1. In an embodiment, the calculation is further based on a risk factor. At step 706, the processor determines whether there are modules in the configuration for which an adjusted power budget has not been calculated. If there are modules for which an adjusted power budget has not been calculated, the method returns to step 703. If adjusted power budgets have been calculated for all hardware modules, the method continues to step 707. At step 707, the processor calculates a total adjusted power budget for the information handling system configuration.

Figure 8:
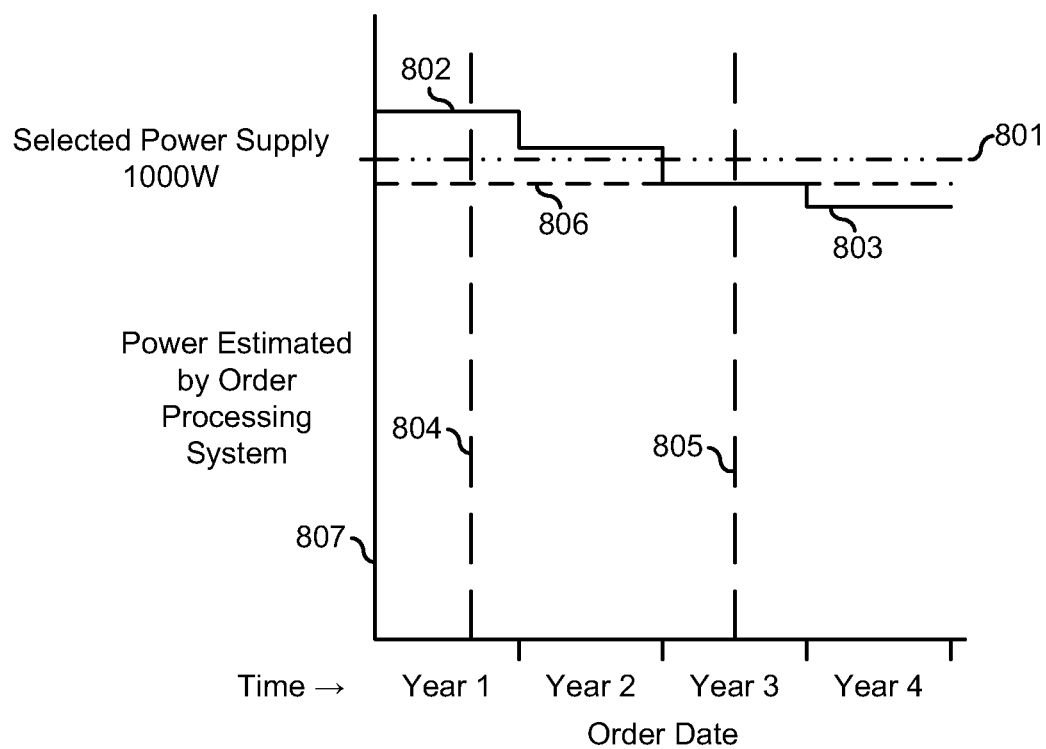
FIG. 8 is a graph illustrating power estimates by an order processing system according to an embodiment of the present disclosure.

FIG. 8 shows power graph 800 illustrating power estimates made by an order processing system for an information handling system configuration according to an embodiment of the present disclosure. The information handling system configuration includes hardware modules for which adjusted power estimates may be made as discussed with respect to FIG. 1. The power consumption of hardware modules included in the information handling system varies with the time of manufacture of the modules as described with respect to FIG. 1. Thus, the estimate of power consumed by an information handling system depends on the manufacture date of the hardware modules. Hardware modules installed in an information handling system may be expected to have been manufactured shortly prior to the construction of the information handling system, and the information handling system may be expected to be ordered shortly prior to construction, thus the order date of the information handling system is a suitable approximation of the date of manufacture of hardware modules installed in the information handling system. As the estimated power consumption for hardware modules manufactured at a later date may be less, an estimate of power consumption made by the order processing system for an information handling system configuration containing the hardware module may also be less for a later order date than for an earlier order date.

The vertical axis of power graph 800 represents the power estimated by the order processing system. The horizontal axis represents order date. The graph is not to scale. Power level 801 represents a maximum power output of a power supply included in the information handling system configuration, illustrated at FIG. 8 as 1000 W. Power curve 803 represents the estimates of power consumption made by the order processing system for the information handling system configuration for order dates in years 1-4. As illustrated at FIG. 8, each year on the horizontal axis represents one power reduction period. Time 807, the beginning of year 1, is the baseline date for the calculation of an adjusted power budget as described with respect to FIG. 1. At order date 804, the estimated power 802 is greater than 1000 W. Time 804 is within the first power reduction period. The calculation described with respect to FIG. 1 estimates that no reductions in module power consumption have occurred at order date 804, thus the power estimate is based on the baseline power for the hardware modules. The order processing system determines that the information handling system configuration is not valid at order date 804 in response to the estimated power consumption being larger than the maximum power output of the power supply. Order date 805 is illustrated as a time in year 3. Times in year 3 are more than two full power reduction intervals after the baseline date at time 807. The estimated power for hardware modules manufactured in year 3 is based on an adjusted power budget as described above. The estimated power 806 for the information handling system configuration at order date 805 is less than 1000 W. The order processing system determines that the information handling system configuration is valid at order date 805.

In an embodiment, an order processing system recommends a change to an information handling system based on an estimated power consumption. For example, at order date 805, the estimated power consumption is less than the power level 801 of the power supply as indicated in the information handling system configuration. The order processing system may be programmed to recommend a valid information handling system configuration including a power supply with a maximum rating less than power level 801. As another example, at order date 804 the order processing system may recommend a larger power supply having a maximum power output greater than power level 802 or may recommend a configuration of hardware modules having an estimated power consumption less than power level 801.

Figure 9:
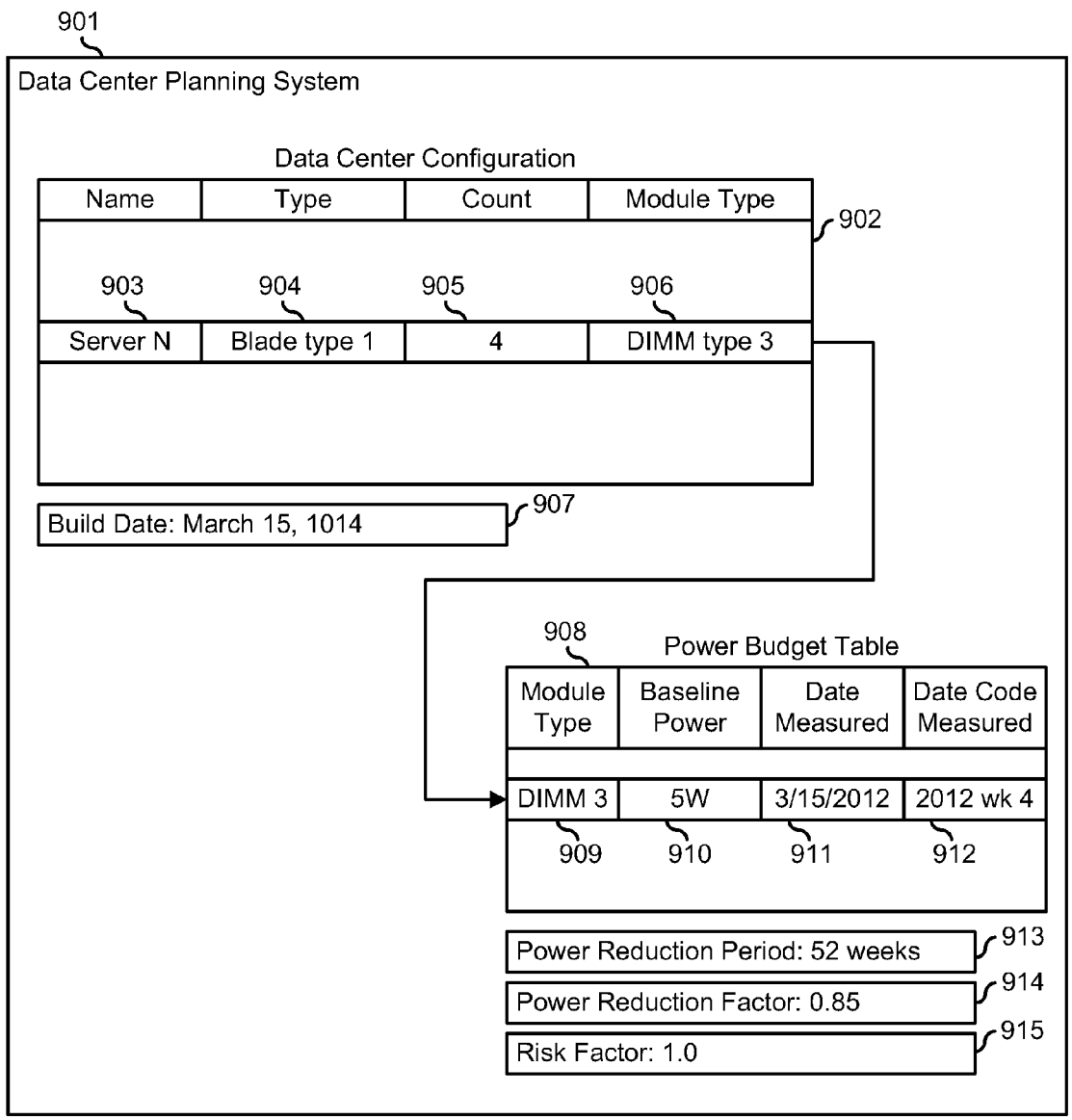
FIG. 9 is a block diagram of a data center planning system according to an embodiment of the present disclosure.

FIG. 9 shows block diagram 900 of a data center planning system 901 according to an embodiment of the present disclosure. The data center planning system 901 uses an adjusted power budget for a hardware module calculated as discussed with respect to FIG. 1 to estimate power consumption for a data center configuration. The data center planning system 901 is implemented using computer hardware including a memory and a processor. The processor executes instructions stored in the memory to implement data center planning system functions. The data center planning system 901 calculates an estimated power consumption of a data center constructed using data center configuration 902. The data center configuration 902 includes information identifying equipment in a data center. For example, information may be stored in a configuration specifying the number and types of server computers, of power supplies, and of cooling units. Data center configuration 902 includes an entry specifying a server. The entry includes a server name 903, a server type 904, a count of memory modules 905 and a memory module type 906. Data center planning system 901 includes build date 907 associated with data center configuration 902. In an embodiment, the build date 907 is determined by the data center planning system 901. In an embodiment the build date 907 is the current date. In an embodiment the build date 907 is a date that the data center may be constructed. In an embodiment, the build date 907 is a date based on input provided by a user of the data center planning system 901. For example, the build date 907 may be calculated as a fixed number of weeks prior to a desired date, entered by a user, for completion of a data center.

The data center planning system 901 includes a power budget table 908. Each entry in the power budget table 908 contains information about a particular type of hardware module. For purposes of illustration power budget table 908 includes a module type 909, a baseline power budget 910, a measurement date 911, and a date code 912. The baseline power budget 910 and dates 911 and 912 are determined as discussed with respect to FIG. 1. The data center planning system 901 includes values for a power reduction period 913, for a power reduction factor 914 and for a risk factor 915. In an embodiment, each entry in power budget table 908 includes a power reduction factor and a power reduction period. In an embodiment, an entry in a power budget table includes a risk factor.

Figure 10:
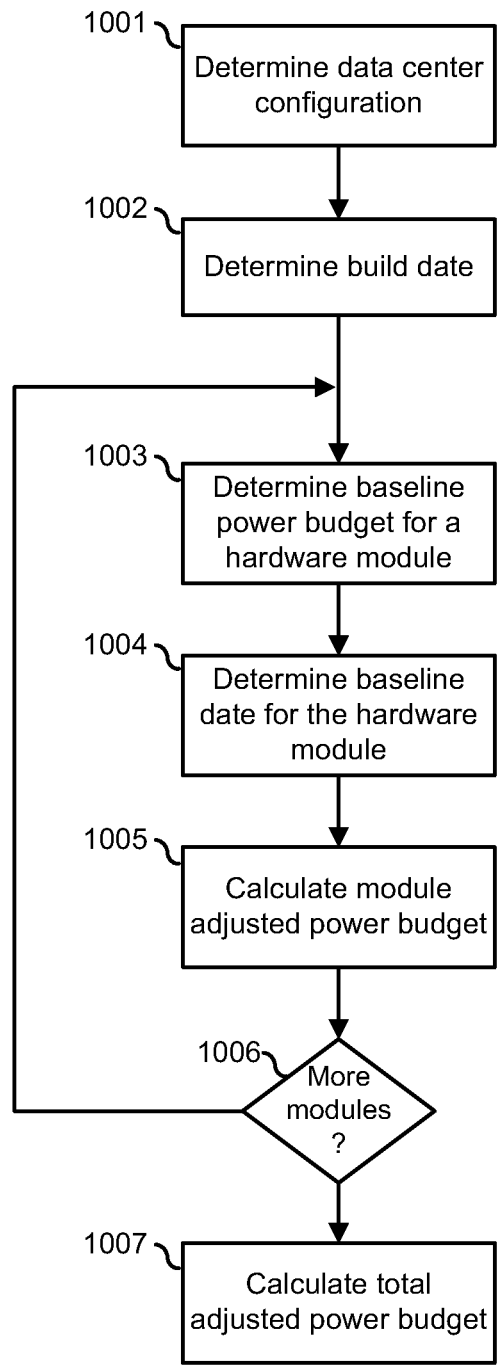
FIG. 10 is a flow diagram of a method for calculating an adjusted power budget in a data center planning system according to an embodiment of the present disclosure.

FIG. 10 shows flow diagram 1000 for estimating the power consumption of a data center configuration by a data center planning system. The processor of the data center planning system, for example the data center planning system 901 illustrated at FIG. 9, executes instructions to perform the method. At step 1001 the processor determines a data center configuration. The data center configuration includes information about the components of a data center as discussed with respect to FIG. 9. In an embodiment, the configuration is determined based input by a user of the data center planning system. In another embodiment, the configuration is determined by the data center planning tool using a predetermined template which the user may adjust, for example by selecting a number of blade server processors to be included in the configuration. At step 1002 the processor determines a build date. The build date may be determined as discussed with respect to FIG. 9. At step 1003 the processor determines the baseline power budget for a hardware module. In the example data center configuration at FIG. 9, the processor reads the memory module type 906 from data center configuration 902. The processor then determines that an entry in power budget table 908 corresponds to the memory module type, and reads baseline power 910 from the power budget table entry. At step 1004 the processor determines a baseline date. In an embodiment, the processor uses a date from a power budget table entry as the baseline date, for example date measured 911 from power budget table 908. In other embodiments, the processor uses a date code measured as the baseline date, for example date code measured 912 from power budget table 908.

At step 1005 the processor calculates the adjusted power budget for the module. The adjusted power budget is calculated as described with respect to FIG. 1. At step 1006 the processor determines if adjusted power budgets must be calculated for additional hardware modules. If more modules require calculation of an adjusted power budget, the processor selects another module and returns to step 1003. If adjusted power budgets have been calculated for all modules, the processor method continues at step 1007 to calculate the total adjusted power budget for the data center configuration.

Figure 11:
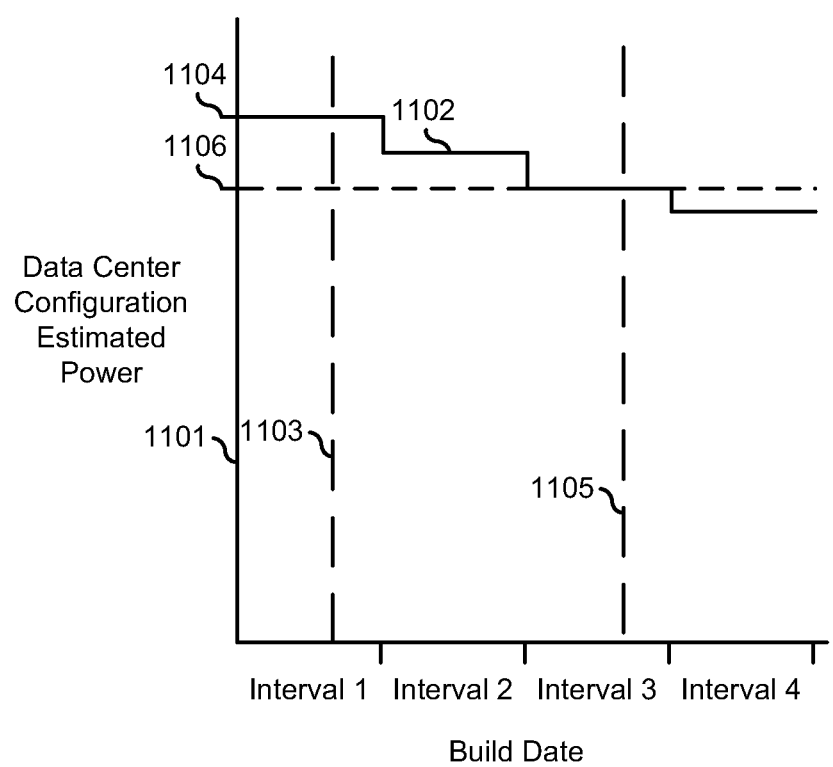
FIG. 11 is a graph illustrating power estimates by a data center planning system according to an embodiment of the present disclosure.

FIG. 11 show data center power estimates made by a data center planning tool according to an embodiment of the present disclosure. Power graph 1100 illustrates power estimates for a data center vs. build date. The vertical axis represents power estimated for a data center configuration. The horizontal axis represents the build date as described with respect to FIG. 9. Date 1101 represents the baseline date associated with the baseline power budget as described above. Power curve 1102 represents the power estimates for a data center configuration made by a data center planning system as a function of build date. The power consumption of memory components included in the data center configuration varies with the time of manufacture of the components as described with respect to FIG. 1. Thus, the estimate of power consumed by a data center configuration depends on the manufacture date of the memory components. Memory components installed in a data center may be expected to have been manufactured shortly prior to the construction of a data center, thus the build date of the data center is a suitable approximation of the date of manufacture of memory components installed in the data center. At build date 1103, the data center planning tool estimates the power for a data center configuration to be power level 1104. Build date 1103 is within the first power reduction interval. As described with respect to FIG. 1, during the first power reduction interval the estimated power budget for a hardware module is the baseline power budget. At build date 1105 the data center planning system estimates the power for a data center configuration to be power level 1106. Build date 1105 is within power reduction interval 3. Memory components manufactured during power reduction interval 3 are estimated to consume less power than components manufactured during power reduction interval 1, thus the estimate of power consumed by the data center configuration including the memory components is lower for build date 1105 than for build date 1103.

Embodiments of the present disclosure may be used together, such that basing power estimates on a date enables in-system software, ordering software and planning software to provide the same adjusted power estimates using existing date synchronization solutions. In-system software reads date codes from memory modules, the date that the memory module power budget tables were created, and a duration until a power reduction is predicted. Planning and ordering software has access to the same power budget tables as in-system software, the date that the memory modules power budget tables were created and the duration until a power reduction is predicted. Planning and ordering software does not have direct access to memory module date codes. However, memory modules are incorporated into data processing systems soon after the manufacture of the memory modules. In a similar manner, data processing systems are incorporated into data centers soon after assembly. Thus, dates of assembly or construction may provide a good approximation of the date of manufacture of memory modules allowing in-system software, ordering software and planning software to remain closely synchronized in their adjusted estimates of module power consumption. For example, an order processing system may use a power budget table containing baseline power budgets, power reduction periods and power reduction factors for memory modules used in information handling systems. The order processing system may process an order recommending a particular power supply for an information handling system based on power estimates made as described herein using the power budget table. An information handling system built in response to the order may use an in-system power budget table based on the power budget table used by the order processing system to estimate power consumption as described herein to set an over-current warning limit on the power supply.

It will be appreciated that although the foregoing discussion describes estimating power for memory components the techniques disclosed herein may be applied to other types of components of a data processing center for which the power consumed by components of the type is periodically improved. For example, hard disk drives may experience periodic reductions in power consumption.

Figure 12:
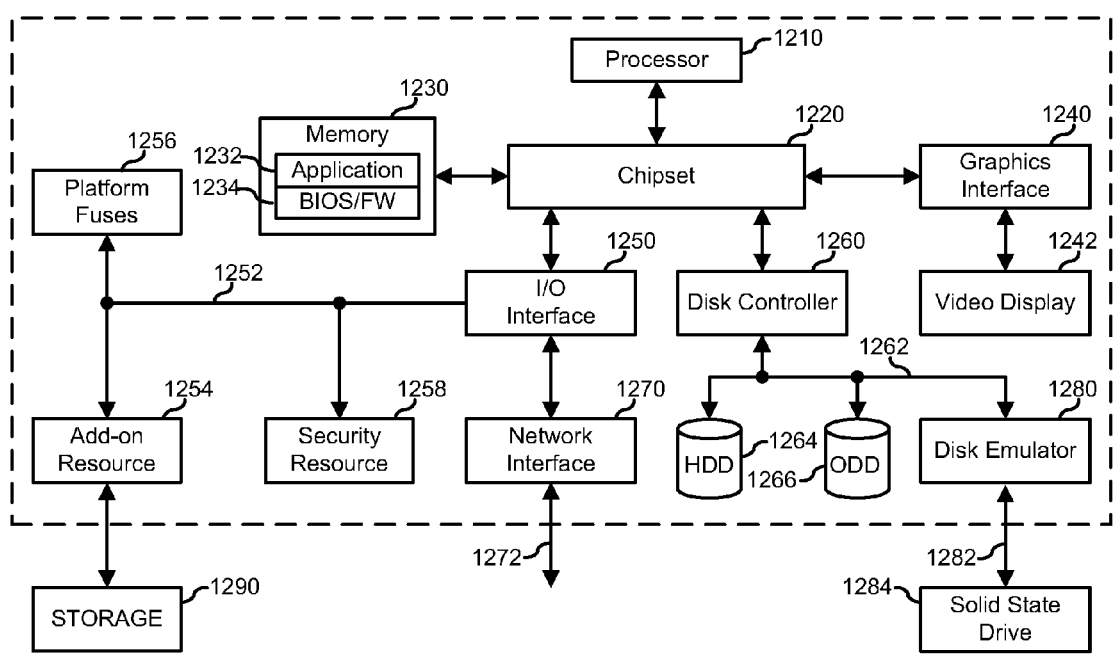
FIG. 12 is a diagram of an information handling system according to an embodiment of the present disclosure.

FIG. 12 is a block diagram illustrating an embodiment of an information handling system 1200, including a processor 1210, a chipset 1220, a memory 1230, a graphics interface 1240, an input/output (I/O) interface 1250, a disk controller 1260, a network interface 1270, and a disk emulator 1280. In a particular embodiment, information handling system 1200 is used to carry out one or more of the methods described herein. In another embodiment, one or more of the systems described herein are implemented in the form of information handling system 1200.

Chipset 1220 is connected to and supports processor 1210, allowing the processor to execute machine-executable code. In a particular embodiment, information handling system 1200 includes one or more additional processors, and chipset 1220 supports the multiple processors, allowing for simultaneous processing by each of the processors and permitting the exchange of information among the processors and the other elements of the information handling system. Chipset 1220 can be connected to processor 1210 via a unique channel, or via a bus that shares information among the processor, the chipset, and other elements of information handling system 1200.

Memory 1230 is connected to chipset 1220. Memory 1230 and chipset 1220 can be connected via a unique channel, or via a bus that shares information among the chipset, the memory, and other elements of information handling system 1200. In another embodiment (not illustrated), processor 1210 is connected to memory 1230 via a unique channel. In another embodiment (not illustrated), information handling system 1200 includes separate memory dedicated to each of the one or more additional processors. A non-limiting example of memory 1230 includes static random access memory (SRAM), dynamic random access memory (DRAM), non-volatile random access memory (NVRAM), read only memory (ROM), flash memory, another type of memory, or any combination thereof.

Graphics interface 1240 is connected to chipset 1220. Graphics interface 1240 and chipset 1220 can be connected via a unique channel, or via a bus that shares information among the chipset, the graphics interface, and other elements of information handling system 1200. Graphics interface 1240 is connected to a video display 1242. Other graphics interfaces (not illustrated) can also be used in addition to graphics interface 1240 as needed or desired. Video display 1242 includes one or more types of video displays, such as a flat panel display, another type of display device, or any combination thereof.

I/O interface 1250 is connected to chipset 1220. I/O interface 1250 and chipset 1220 can be connected via a unique channel, or via a bus that shares information among the chipset, the I/O interface, and other elements of information handling system 1200. Other I/O interfaces (not illustrated) can also be used in addition to I/O interface 1250 as needed or desired. I/O interface 1250 is connected via an I/O interface 1252 to one or more add-on resources 1254. Add-on resource 1254 is connected to a storage system 1290, and can also include another data storage system, a graphics interface, a network interface card (NIC), a sound/video processing card, another suitable add-on resource or any combination thereof. I/O interface 1250 is also connected via I/O interface 1252 to one or more platform fuses 1256 and to a security resource 1258. Platform fuses 1256 function to set or modify the functionality of information handling system 1200 in hardware. Security resource 1258 provides a secure cryptographic functionality and includes secure storage of cryptographic keys. A non-limiting example of security resource 1258 includes a Unified Security Hub (USH), a Trusted Platform Module (TPM), a General Purpose Encryption (GPE) engine, another security resource, or a combination thereof.

Disk controller 1260 is connected to chipset 1220. Disk controller 1260 and chipset 1220 can be connected via a unique channel, or via a bus that shares information among the chipset, the disk controller, and other elements of information handling system 1200. Other disk controllers (not illustrated) can also be used in addition to disk controller 1260 as needed or desired. Disk controller 1260 includes a disk interface 1262. Disk controller 1260 is connected to one or more disk drives via disk interface 1262. Such disk drives include a hard disk drive (HDD) 1264, and an optical disk drive (ODD) 1266, and can include one or more disk drive as needed or desired. ODD 1266 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 1260 is connected to disk emulator 1280. Disk emulator 1280 permits a solid-state drive 1284 to be coupled to information handling system 1200 via an external interface 1282. External interface 1282 can include industry standard busses such as USB or IEEE 1394 (Firewire) or proprietary busses, or any combination thereof. Alternatively, solid-state drive 1284 can be disposed within information handling system 1200.

Network interface device 1270 is connected to I/O interface 1250. Network interface 1270 and I/O interface 1250 can be coupled via a unique channel, or via a bus that shares information among the I/O interface, the network interface, and other elements of information handling system 1200. Other network interfaces (not illustrated) can also be used in addition to network interface 1270 as needed or desired.

Network interface 1270 can be a network interface card (NIC) disposed within information handling system 1200, on a main circuit board such as a baseboard, a motherboard, or any combination thereof, integrated onto another component such as chipset 1220, in another suitable location, or any combination thereof. Network interface 1270 includes a network channel 1272 that provide interfaces between information handling system 1200 and other devices (not illustrated) that are external to information handling system 1200. Network interface 1270 can also include additional network channels (not illustrated).

Information handling system 1200 includes one or more application programs 1232, and Basic Input/Output System and Firmware (BIOS/FW) code 1234. BIOS/FW code 1234 functions to initialize information handling system 1200 on power up, to launch an operating system, and to manage input and output interactions between the operating system and the other elements of information handling system 1200. In a particular embodiment, application programs 1232 and BIOS/FW code 1234 reside in memory 1230, and include machine-executable code that is executed by processor 1210 to perform various functions of information handling system 1200. In another embodiment (not illustrated), application programs and BIOS/FW code reside in another storage medium of information handling system 1200. For example, application programs and BIOS/FW code can reside in HDD 1264, in a ROM (not illustrated) associated with information handling system 1200, in an option-ROM (not illustrated) associated with various devices of information handling system 1200, in storage system 1290, in a storage system (not illustrated) associated with network channel 1272, in another storage medium of information handling system 1200, or a combination thereof. Application programs 1232 and BIOS/FW code 1234 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a memory; and
a processor operable to:
   determine a system configuration of the information handling system, wherein the system configuration includes a first hardware module; and
   determine an adjusted power budget for the first hardware module, wherein in determining the adjusted power budget the processor is operable to:
      read a date code from the first hardware module;
      determine a baseline power budget for the first hardware module;
      determine a baseline date of the baseline power budget; and
      calculate the adjusted power budget for the first hardware module based on:
         a time interval between the baseline date and the date code;
         the baseline power budget from when the information handling system was developed;
         a power reduction period over which a power decreases; and
         a power reduction factor, wherein the power reduction factor includes a percentage decrease over the power reduction period.

2. The information handling system of claim 1, wherein:
the system configuration further includes a second hardware module of the information handling system; and
the processor is further operable to:
   determine an adjusted power budget for the second hardware module, wherein in determining the processor is operable to:

read a second date code from the second hardware module;
determine a second baseline power budget for the second hardware module;
determine a second baseline date of the second baseline power budget; and
calculate the adjusted power budget for the second hardware module based on:
a second time interval between the second baseline date and the second date code;
the second baseline power budget from when the information handling system was developed;
the power reduction period over which the power decreases; and
the power reduction factor; and
calculate a total adjusted power budget based on the adjusted power budget for the first hardware module and the adjusted power budget for the second hardware module.

3. The information handling system of claim 1, further comprising:
a voltage regulator, wherein:
the voltage regulator has an over-current warning threshold; and
the over-current warning threshold is set based on the adjusted power budget.

4. The information handling system of claim 1, further comprising:
a power supply, wherein:
the power supply has an over-current warning threshold; and
the over-current warning threshold is set based on the adjusted power budget.

5. The information handling system of claim 1, wherein:
the baseline power budget, the power reduction period and the power reduction factor are obtained from a first power budget table; and
the first power budget table is based on a second power budget table used by an order processing system.

6. The information handling system of claim 1, wherein the processor is further operable to:
create a new virtual machine environment based on the adjusted power budget.

7. The information handling system of claim 1, wherein the first hardware module is a memory module.

8. The information handling system of claim 1, wherein the calculated adjusted power budget is further based on a risk factor.

9. The information handling system of claim 8, wherein the calculated adjusted power budget is APB:

$$APB=BL*(H*R)^P,$$

where,
BL=the baseline power budget,
H=the power reduction factor,
R=the risk factor, and
P=the whole number part of (the time interval/the power reduction period).

10. An order processing system comprising:
a memory; and
a processor operable to:
determine an adjusted power budget for a hardware module of an information handling system configuration, wherein in determining the adjusted power budget the processor is operable to:
determine an order date of the information handling system;
determine a baseline power budget for the hardware module;
determine a baseline date of the baseline power budget; and
calculate the adjusted power budget for the hardware module based on:
a time interval between the baseline date and the order date;
the baseline power budget;
a power reduction period over which a power decreases; and
a power reduction factor, wherein the power reduction factor includes a percentage decrease over the power reduction period; and
calculate an estimated power consumption for the information handling system configuration based on the adjusted power budget.

11. The order processing system of claim 10, wherein:
the processor is further operable to determine that the information handling system configuration is a valid configuration, based on the estimated power consumption.

12. The order processing system of claim 10, wherein the order date is determined based on input from a user.

13. The order processing system of claim 10, wherein the hardware module is a memory module.

14. The order processing system of claim 10, wherein the calculated adjusted power budget is further based on a risk factor.

15. The order processing system of claim 14, wherein the calculated adjusted power budget is APB:

$$APB=BL*(H*R)^P,$$

where,
BL=the baseline power budget,
H=the power reduction factor,
R=the risk factor, and
P=the whole number part of (the time interval/the power reduction period).

16. A data center planning system comprising:
a memory; and
a processor operable to:
determine a build date for a data center configuration;
determine an adjusted power budget for a hardware module of the data center configuration, wherein in determining the adjusted power budget the processor is operable to:
determine a baseline power budget for the hardware module;
determine a baseline date of the baseline power budget; and
calculate the adjusted power budget for the hardware module based on:
a time interval between the baseline date and the build date;
the baseline power budget from when the information handling system was developed;
a power reduction period; and
a power reduction factor, wherein the power reduction factor includes a percentage decrease over the power reduction period; and
estimate the power consumption for the data center configuration based on the adjusted power budget.

17. The data center planning system of claim 16, wherein the processor is further operable to:
determine that the data center configuration is not a valid configuration; and in response to the data center configuration not being a valid configuration, recommend a second data center configuration based on the estimated power consumption.

18. The data center planning system of claim 16, wherein the build date is determined based on input from a user.

19. The data center planning system of claim 16, wherein the calculated adjusted power budget is further based on a risk factor.

20. The data center planning system of claim 19, wherein the calculated adjusted power budget is APB:

$$APB = BL \ast (H \ast R)^P,$$

where,
BL=the baseline power budget,
H=the power reduction factor,
R=the risk factor, and
P=the whole number part of (the time interval/the power reduction period).

* * * * *